Figures 1, 2:
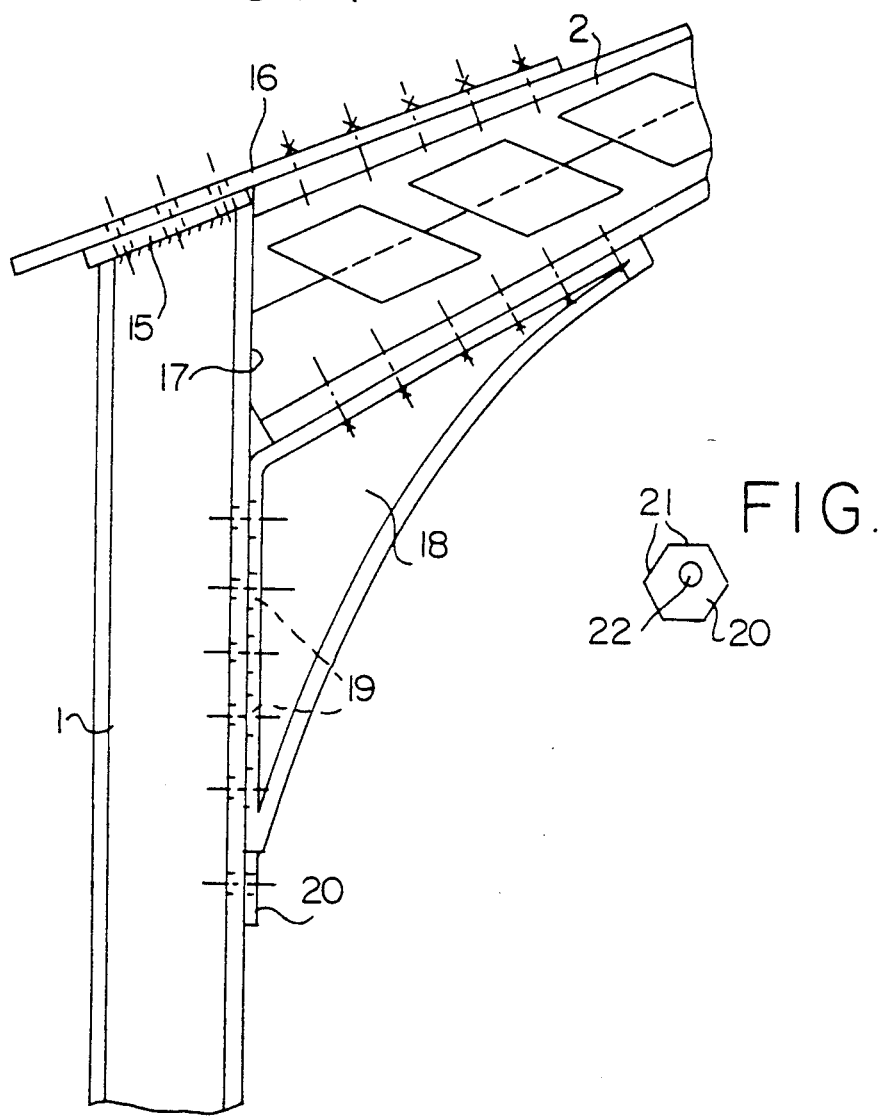

United States Patent [19]

Wolf

[11] Patent Number: 5,040,343
[45] Date of Patent: Aug. 20, 1991

[54] ASSEMBLY OF STEEL COLUMN AND WOODEN ROOF TRUSS

[75] Inventor: Johann Wolf, Scharnstein, Austria

[73] Assignee: Wolf Systembau Gesellschaft m.b.H. KG., Scharnstein, Austria

[21] Appl. No.: 556,458

[22] Filed: Jul. 24, 1990

Related U.S. Application Data

[62] Division of Ser. No. 262,715, Oct. 26, 1988, Pat. No. 4,995,214.

[30] Foreign Application Priority Data

Nov. 4, 1987 [AT] Austria .................. A2916/87

[51] Int. Cl.5 ............................... E04B 7/02
[52] U.S. Cl. ......................... 52/90; 52/93; 52/283
[58] Field of Search ............. 52/93, 642, 639, 283

[56] References Cited

U.S. PATENT DOCUMENTS

| 2,458,606 | 1/1949 | Knabe | 52/90 |
|---|---|---|---|
| 2,796,642 | 6/1957 | Woodworth | 52/93 |
| 3,157,251 | 11/1964 | Rasch | 52/93 |
| 3,309,120 | 3/1967 | Wada | 52/93 |
| 4,854,104 | 8/1989 | Pomento | 52/642 |

FOREIGN PATENT DOCUMENTS

| 717975 | 1/1932 | France | 52/93 |
|---|---|---|---|
| 866151 | 6/1941 | France | 52/93 |
| 12418 | of 1911 | United Kingdom | 52/90 |
| 814388 | 6/1959 | United Kingdom | 52/90 |

Primary Examiner—Henry E. Raduazo
Attorney, Agent, or Firm—Young & Thompson

[57] ABSTRACT

A connecting element for the connection of sectional steel columns with roof trusses consisting of wood and exhibiting mutually converging lateral faces, for the erection of hall constructions and the like. The roof truss (2) has an end face (17) in flush contact with the column (1) and a steel band (16) is attached to the topside of the roof truss (2) for connection with the column (1) which latter is beveled in correspondence with the slope of the roof. This steel band is connectible with the column (1) by welding or by a flange plate (15) fastened to the column (1). A haunch-shaped supporting element (18) is provided on the inside between the column (1) and the roof truss (2).

3 Claims, 1 Drawing Sheet

ASSEMBLY OF STEEL COLUMN AND WOODEN ROOF TRUSS

This application is a division of application Ser. No. 262,715, filed 10/26/88 and now U.S. Pat. No. 4,995,214.

The invention relates to an assembly of a steel column and a wooden roof truss for the erection of hall constructions and the like, wherein the columns and the roof trusses exhibit confluent (converging) side faces.

A column-roof truss connection has been known from U.S. Pat. No. 2,796,642 (C. H. Woodworth) wherein a column which exhibits converging side faces is connected to a roof truss of the same shape by means of a steel rail which is angled and threadedly attached to the outside. The ends of the beams are cut at a bevel in correspondence with the slope of the roof and rest with the ends (end faces) on a movable steel plate, which thus can be adapted to the beveled surfaces, in order to avoid splintering; the steel plate is equipped with an abutment to absorb the pressure. In this arrangement, the beams can be additionally secured on the inside by means of threadable, short legs firmly joined to the abutments.

Another joint connection has been known from U.S. Pat. No. 3,099,468 (C. E. Meyerdick). However, this structure is intended for round or rectangular beams. Furthermore, the beams must be extensively accurate in their dimensions since merely the outer ends of the external border can be pressed into place. The joint does not exhibit a separation of the two connections so that assembly at the building site is made extensively difficult.

Starting with this known state of the art, the object of this invention resides in providing beams and/or composite girders produced therefrom, which have converging side faces, or columns of sectional steel and roof trusses having converging side faces, with adaptable elements, so that they can be assembled at the building site in a simple way, and in fashioning the junction point in such a way that it conforms to the load curve.

In order to attain this object, the invention provides an assembly of a steel column and a wooden roof truss wherein the roof truss has an end face in flush contact with the column and wherein a steel band is fastened to the topside of the roof truss for connection with the column which latter is beveled in correspondence with the slope of the roof, this steel band being connectible to the column by means of welding or by means of a flange plate fastened to the column; and wherein a haunch-shaped supporting element is provided on the inside between the column and roof truss.

In this connection, the provision is furthermore made that the leg of the supporting element in contact with the column is equipped with slotted holes for the accommodation of a screw connection with a flange of the sectional steel profile of the column; a retaining disk to support the supporting element during the establishment of the connection can be attached with the sectional steel. In this arrangement, the retaining disk is fashioned to be polyhedral in accordance with the invention, the individual edges exhibiting a differing spacing from a bore provided at the column for mounting purposes.

Additional details of the invention can be seen from the following description. An embodiment of the assembly of this invention is schematically depicted in the drawing wherein:

FIG. 1 shows a lateral view of an assembly of steel column and wooden roof truss, and FIG. 2 shows a detail of the arrangement of FIG. 1 in lateral view.

FIG. 1 shows a connecting element of a column 1, which latter consists of an I girder, with a composite roof truss having converging side faces 2. The sectional steel column 1 is terminated at the top by a welded-on flange plate 15 sloping in correspondence with the required roof slope. The roof truss 2 is threaded, with a steel band 16, preassembled with this roof truss, to the flange plate 15 of the column 1. The roof truss 2 is cut at such a bevel that its end face 17 is in flat contact with the column 1. In case of large objects with uniform columns 1, the steel band 16 can also be directly welded to the column if corresponding measures are taken for threaded attachment of the roof truss 2 without any problems (predrilled roof trusses and pneumatic screw tool). The steel band 16 can also be lengthened toward the outside in order to be able to attach roof projections, if desired.

A supporting element 18 is threaded onto the inside of the column 1 and of the roof truss 2; this element has slotted holes 19 on the column side to ensure flush contact with the roof truss 2. In order to optimally transfer the roof load into the column, the supporting element 18 is fashioned to be haunched and rigidified in correspondence with the load. The end of the haunch is fixed in place by a retaining disk 20 to prevent shifting in the slotted holes 19 along the column 1. This retaining disk is polyhedral, the edges 21 exhibiting differing distances to the bore 22 (FIG. 2), and the retaining disk can thus be mounted in contact with the haunch and can be threaded to the column 1.

What is claimed is:

1. An assembly of a vertical steel column and an inclined wooden roof truss that extends upwardly away from the column, the truss having a vertical end surface in flush contact with a vertical side surface of the column, the column terminating upwardly in an upper surface, a steel band fastened to said upper surface of the column and an upper surface of the truss, and a haunch-shaped supporting element secured to a vertical surface of the column and a lower surface of the truss, said haunch-shaped supporting element having a vertical web that extends between and interconnects portions of the supporting element that are secured to said column and to said truss.

2. An assembly according to claim 1, in which said portion of the supporting element secured to the column has slotted holes for accommodating a screw connection with said column, and a retaining disk secured to the column for supporting the supporting element during establishment of the connection of the haunch member to the column.

3. An assembly according to claim 2, in which the retaining disk is polyhedral, individual edges of the disk having different spacings from a bore by which the disk is mounted on the column.

* * * * *